United States Patent
Rice et al.

(10) Patent No.: US 11,822,513 B2
(45) Date of Patent: Nov. 21, 2023

(54) WORK SPACES INCLUDING LINKS TO CONTENT ITEMS IN THEIR NATIVE STORAGE LOCATION

(71) Applicant: Dropbox, Inc., San Francisco, CA (US)

(72) Inventors: Tristan Rice, San Francisco, CA (US); Shiu Ling Kwok, Menlo Park, CA (US); Jason Perez, San Francisco, CA (US); Joseph Grillo, San Francisco, CA (US); Boyang Niu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 231 days.

(21) Appl. No.: 17/087,902

(22) Filed: Nov. 3, 2020

(65) Prior Publication Data
US 2022/0092026 A1     Mar. 24, 2022

Related U.S. Application Data

(60) Provisional application No. 63/080,107, filed on Sep. 18, 2020.

(51) Int. Cl.
*G06F 16/00* (2019.01)
*G06F 16/16* (2019.01)
*G06F 16/176* (2019.01)

(52) U.S. Cl.
CPC ............ *G06F 16/16* (2019.01); *G06F 16/176* (2019.01)

(58) Field of Classification Search
None
See application file for complete search history.

(56) References Cited

U.S. PATENT DOCUMENTS

| | | |
|---|---|---|
| 7,689,510 B2 | 3/2010 | Lamkin et al. |
| 7,693,958 B2 | 4/2010 | Teodosiu et al. |
| 8,015,491 B2 | 9/2011 | Shaver et al. |
| 8,117,271 B2 | 2/2012 | Mcconn et al. |
| 8,122,051 B2 | 2/2012 | Spring et al. |
| 8,341,532 B2 | 12/2012 | Ryan et al. |
| 8,438,210 B2 | 5/2013 | Poder et al. |
| 8,548,992 B2 | 10/2013 | Abramoff et al. |
| 8,688,738 B2 | 4/2014 | Colton et al. |
| 8,700,719 B1 | 4/2014 | Covitz et al. |
| 8,706,886 B2 | 4/2014 | Aiello et al. |
| 8,713,106 B2 | 4/2014 | Spataro et al. |
| 8,793,324 B1 | 7/2014 | Schabes et al. |
| 8,892,679 B1 | 11/2014 | Destagnol et al. |

(Continued)

FOREIGN PATENT DOCUMENTS

WO     2009036417 A2     3/2009

OTHER PUBLICATIONS

Amazon, "Amazon WorkSpaces FAQs", Retrieved from https://aws.amazon.com/workspaces/faqs/on Aug. 9, 2020, 55 pages.

(Continued)

*Primary Examiner* — Thu Nguyet T Le
(74) *Attorney, Agent, or Firm* — Polsinelli PC

(57) ABSTRACT

A system having a spaces service configured to host a first space that collects first data pertaining to a first topic and further configured to host a second space that collects second data pertaining to a second topic. The first data may include a link to a content item. The second data may include a second link to the content item.

18 Claims, 7 Drawing Sheets

(56) References Cited

U.S. PATENT DOCUMENTS

| | | | |
|---|---|---|---|
| 8,930,412 B2 | 1/2015 | Nelson et al. | |
| 8,990,151 B2 | 3/2015 | Savage et al. | |
| 9,002,962 B2 | 4/2015 | Lynch et al. | |
| 9,049,176 B2 | 6/2015 | Ferdowsi et al. | |
| 9,081,793 B2 | 7/2015 | Kojima et al. | |
| 9,423,922 B2 | 8/2016 | Welinder et al. | |
| 9,978,040 B2 | 5/2018 | Lee et al. | |
| 10,013,429 B2 | 7/2018 | Dahod et al. | |
| 10,079,789 B2 | 9/2018 | Schultz et al. | |
| 2003/0135565 A1 | 7/2003 | Estrada | |
| 2005/0222931 A1 | 10/2005 | Mamou et al. | |
| 2007/0100829 A1 | 5/2007 | Allen et al. | |
| 2009/0100068 A1 | 4/2009 | Gauba et al. | |
| 2009/0106671 A1 | 4/2009 | Olson et al. | |
| 2009/0177754 A1 | 7/2009 | Brezina et al. | |
| 2009/0192845 A1* | 7/2009 | Gudipaty | G06F 3/04842 715/733 |
| 2010/0082713 A1 | 4/2010 | Frid-Nielsen et al. | |
| 2010/0211621 A1 | 8/2010 | Hariharan et al. | |
| 2010/0241711 A1 | 9/2010 | Ansari et al. | |
| 2012/0151379 A1 | 6/2012 | Schultz et al. | |
| 2012/0221520 A1 | 8/2012 | Garrett et al. | |
| 2012/0284290 A1 | 11/2012 | Keebler et al. | |
| 2012/0311060 A1 | 12/2012 | Beck et al. | |
| 2013/0013560 A1 | 1/2013 | Goldberg et al. | |
| 2013/0014023 A1 | 1/2013 | Lee et al. | |
| 2013/0124638 A1 | 5/2013 | Barreto et al. | |
| 2013/0132477 A1 | 5/2013 | Bosworth et al. | |
| 2013/0179799 A1 | 7/2013 | Savage | |
| 2013/0191339 A1 | 7/2013 | Haden et al. | |
| 2013/0198600 A1 | 8/2013 | Lockhart et al. | |
| 2013/0212112 A1 | 8/2013 | Blom et al. | |
| 2013/0275509 A1 | 10/2013 | Micucci et al. | |
| 2013/0290326 A1 | 10/2013 | Lebedev | |
| 2013/0332513 A1 | 12/2013 | Honda et al. | |
| 2014/0013246 A1 | 1/2014 | Beechuk et al. | |
| 2014/0047560 A1 | 2/2014 | Meyer et al. | |
| 2014/0136989 A1 | 5/2014 | Choi et al. | |
| 2014/0181697 A1 | 6/2014 | Kirigin | |
| 2014/0189818 A1 | 7/2014 | Meyer | |
| 2014/0208220 A1 | 7/2014 | Watal | |
| 2014/0215551 A1 | 7/2014 | Allain et al. | |
| 2014/0215568 A1 | 7/2014 | Kirigin et al. | |
| 2014/0222701 A1 | 8/2014 | Loh et al. | |
| 2014/0267414 A1 | 9/2014 | Conlan et al. | |
| 2014/0280602 A1 | 9/2014 | Quatrano | |
| 2014/0297759 A1 | 10/2014 | Mody | |
| 2014/0304618 A1 | 10/2014 | Carriero et al. | |
| 2014/0365432 A1 | 12/2014 | Jain et al. | |
| 2015/0032692 A1 | 1/2015 | Litzenberger | |
| 2015/0032829 A1 | 1/2015 | Barshow et al. | |
| 2015/0052458 A1 | 2/2015 | Rothenberger et al. | |
| 2015/0074044 A1 | 3/2015 | Metreveli et al. | |
| 2015/0134808 A1 | 5/2015 | Fushman et al. | |
| 2015/0135097 A1 | 5/2015 | Carriero et al. | |
| 2015/0135300 A1 | 5/2015 | Ford et al. | |
| 2015/0156274 A1 | 6/2015 | Alten et al. | |
| 2015/0269547 A1 | 9/2015 | Fan et al. | |
| 2015/0288775 A1 | 10/2015 | Larabie-Belanger | |
| 2015/0304265 A1 | 10/2015 | Vincent et al. | |
| 2018/0188901 A1* | 7/2018 | Shtuchkin | G06Q 10/10 |

OTHER PUBLICATIONS

Cameron K., et al., "Next-Generation Technical Services (NGTS), Digital Asset Management System (DAMS) Requirements," retrieved from http://libraries.universityofcalifornia.edu/groups/files/ngts/docs/pots/pot1_It1a_finalreport_july2012.pdf, Jul. 20, 2012, 11 pages.

Mislove A., et al., "POST: A secure, resilient, cooperative messaging system," Conference: Proceedings of HotOS'03: 9th Workshop on Hot Topics in Operating Systems, Lihue (Kauai), Hawaii, USA, May 18-21, 2003, 6 pages.

Voida S., et al., "Share and Share Alike: Exploring the User Interface Affordances of File Sharing," Proceedings of the ACM Conference on Human Factors in Computing Systems (CHI 2006), Apr. 22-27, 2006, ACM, 10 pages.

International Search Report and Written Opinion for PCT Application No. PCT/US2021/031037 dated Sep. 20, 2021, 12 pages.

International Preliminary Report on Patentability for PCT Application No. PCT/US2021/031037, dated Mar. 30, 2023, 10 pages.

* cited by examiner

WORK SPACES INCLUDING LINKS TO CONTENT ITEMS IN THEIR NATIVE STORAGE LOCATION

CROSS-REFERENCE TO RELATED APPLICATIONS

This application claims the benefit of priority under U.S.C. § 119(e) of U.S. Provisional Patent Application 63/080,107, filed on Sep. 18, 2020, entitled, WORK SPACES INCLUDING LINKS TO CONTENT ITEMS IN THEIR NATIVE STORAGE LOCATION, which is hereby expressly incorporated herein by reference in its entirety.

TECHNICAL FIELD

The present technology relates to content management in virtual spaces and more particularly to content management of content items that are stored in a single storage location but present in multiple virtual spaces.

BACKGROUND

Computing devices provide various ways for users to interact with digital content. Additionally, employees of modern companies use many different software tools to perform a variety of job functions. For example, an employee, in a single day, may use e-mail, instant messaging, chat, text (SMS) messaging just to communicate with coworkers and project teammates. Additionally, some companies utilize different file systems (e.g., local machine drives, network drives, cloud storage, etc.) to keep track of documents, media items, and other content items that are necessary for performing work or that are the result of work. Furthermore, many different applications are used to view, create, and edit the various content items. The multitude of different software, file systems, and/or applications create unnecessary complexities and inefficiencies.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Computing devices provide various ways for users to interact with digital content. Additionally, employees of modern companies use many different software tools to perform a variety of job functions. For example, an employee, in a single day, may use e-mail, instant messaging, chat, text (SMS) messaging just to communicate with coworkers and project teammates. Additionally, some companies utilize different file systems (e.g., local machine drives, network drives, cloud storage, etc.) to keep track of documents, media items, and other content items that are necessary for performing work or that are the result of work. Furthermore, many different applications are used to view, create, and edit the various content items. The multitude of different software, file systems, and/or applications create unnecessary complexities and inefficiencies.

Additionally, different teams or departments of companies may need to work on a content item. For example, a presentation for a new product can often include many different cross-functional departments, such as marketing, product development, engineering, etc. Each department may have different tasks, activities, schedules, etc. when working on the content item. Providing all contextual data from all departments to all departments can further compound complexities and inefficiencies.

Accordingly, the disclosed technology addresses the need in the art for a content management system configured to provide multiple integrated collaborative workspaces that can access and edit content items with contextual data unique to each respective workspace.

Figure 1:
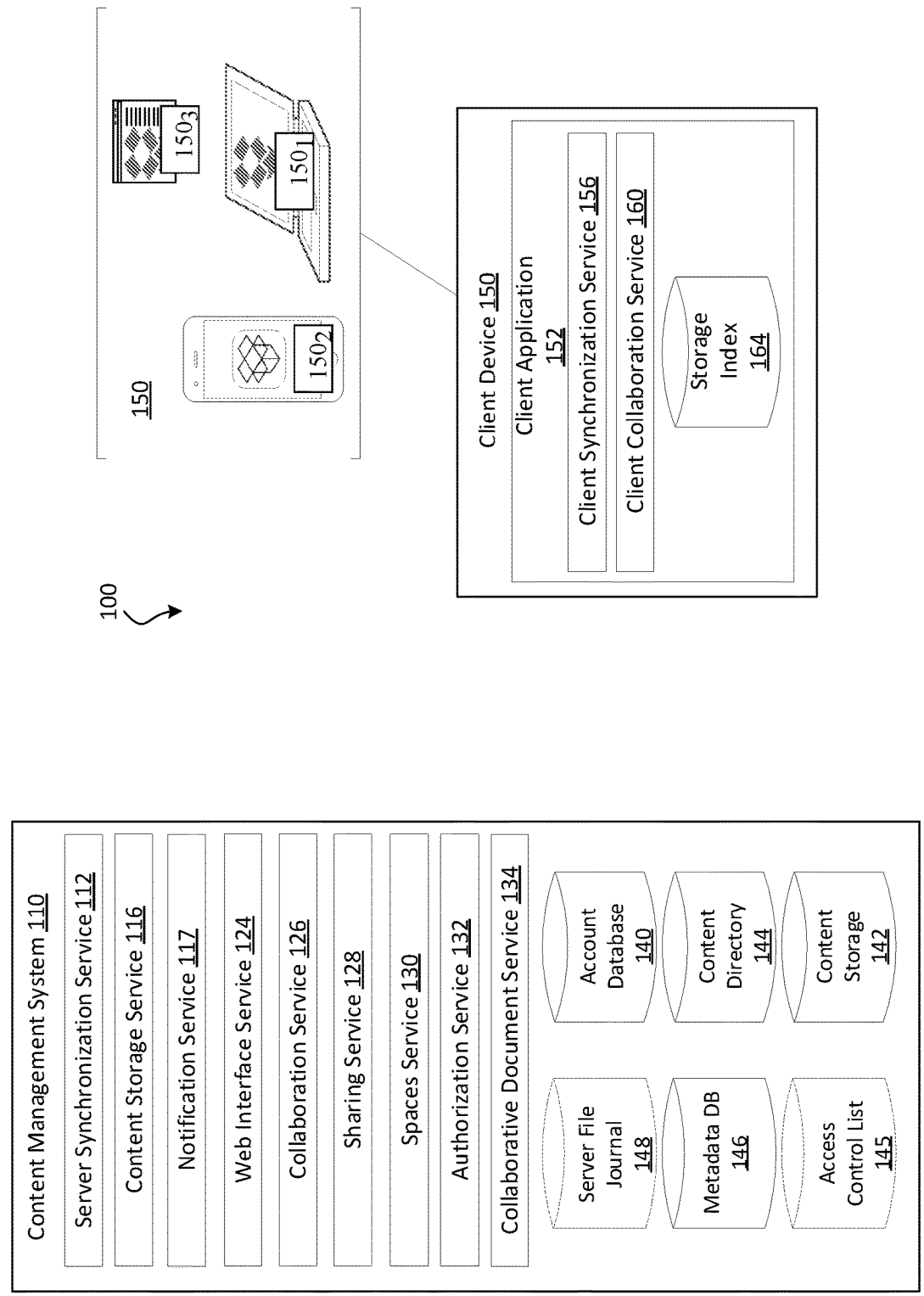
FIG. 1 shows an example of a content management system and client devices.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device 150$_1$ is a computing device having a local file system accessible by multiple applications resident thereon. Client device 150$_2$ is a computing device wherein content items are only accessible to a specific application or by permission given by the specific application, and the content items are typically stored either in an application specific space or in the cloud. Client device 150$_3$ is any client device accessing content management system 110 via a web browser and accessing content items via a web interface. While example client devices 150$_1$, 150$_2$, and 150$_3$ are depicted in form factors such as a laptop, mobile device, or web browser, it should be understood that the descriptions thereof are not limited to devices of these example form factors. For example a mobile device such as client 150$_2$ might have a local file system accessible by multiple applications resident thereon, or client 150$_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Spaces Service

In some embodiments content management system 110 includes spaces service 130. Spaces service 130 can provide functionality for creating, hosting, and managing defined virtual spaces (e.g., a first space, a second space, etc.). Spaces are simulated environments or workspaces, which users can interact with via an interface (e.g., a graphic user interface (GUI)). Spaces can be created for a company, with sub-teams (e.g., business units, or project teams, etc.), and user accounts assigned to teams and sub-teams, or teams can be created for any defined group of user accounts. Spaces service 130 can provide a common shared space for the team, private user account folders, and access limited shared folders. Spaces service 130 can also provide a management interface for an administrator to manage collections and content items within virtual spaces, and can manage user accounts associated with the spaces. Spaces service 130 can be configured to receive and collect data (e.g., messages, links to content items, and tasks, etc.) pertaining to a topic and store the data in an associated space. Furthermore, spaces service 130 can be configured to receive and collect data (e.g., messages, links to content items, and tasks, etc.) pertaining to a second topic and store the data in a space associated with the second topic. Data may pertain to both a first topic and a second topic (e.g., a content item that is relevant to two different departments in a company). Thus, spaces service 130 can include data in both spaces. For example, a cross-department project may have a marketing team working on a marketing presentation (e.g., a content item) in a marketing workspace (e.g., a first space for a first topic), while an engineering team may be providing technical details to include in the marketing presentation in an engineering workspace (e.g., a second space for a second topic). Accordingly, spaces service 130 can include a first link in the marketing workspace to the marketing presentation and a second link in the engineering workspace to the marketing presentation. Spaces service 130 can be configured to access data and content items within each space. Additionally, spaces service 130 can monitor the space and send state information describing the current state of the space (e.g., messages, content, etc.) to client devices 150 so client devices 150 can generate and display graphical user interfaces that allow users to interact with the space. For example, spaces service 130 can generate a space that can serve as browser-based workspace graphical user interfaces (e.g., web pages, web applications, etc.) to browsers running on user client devices 150.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users to access a content item through a web interface where they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
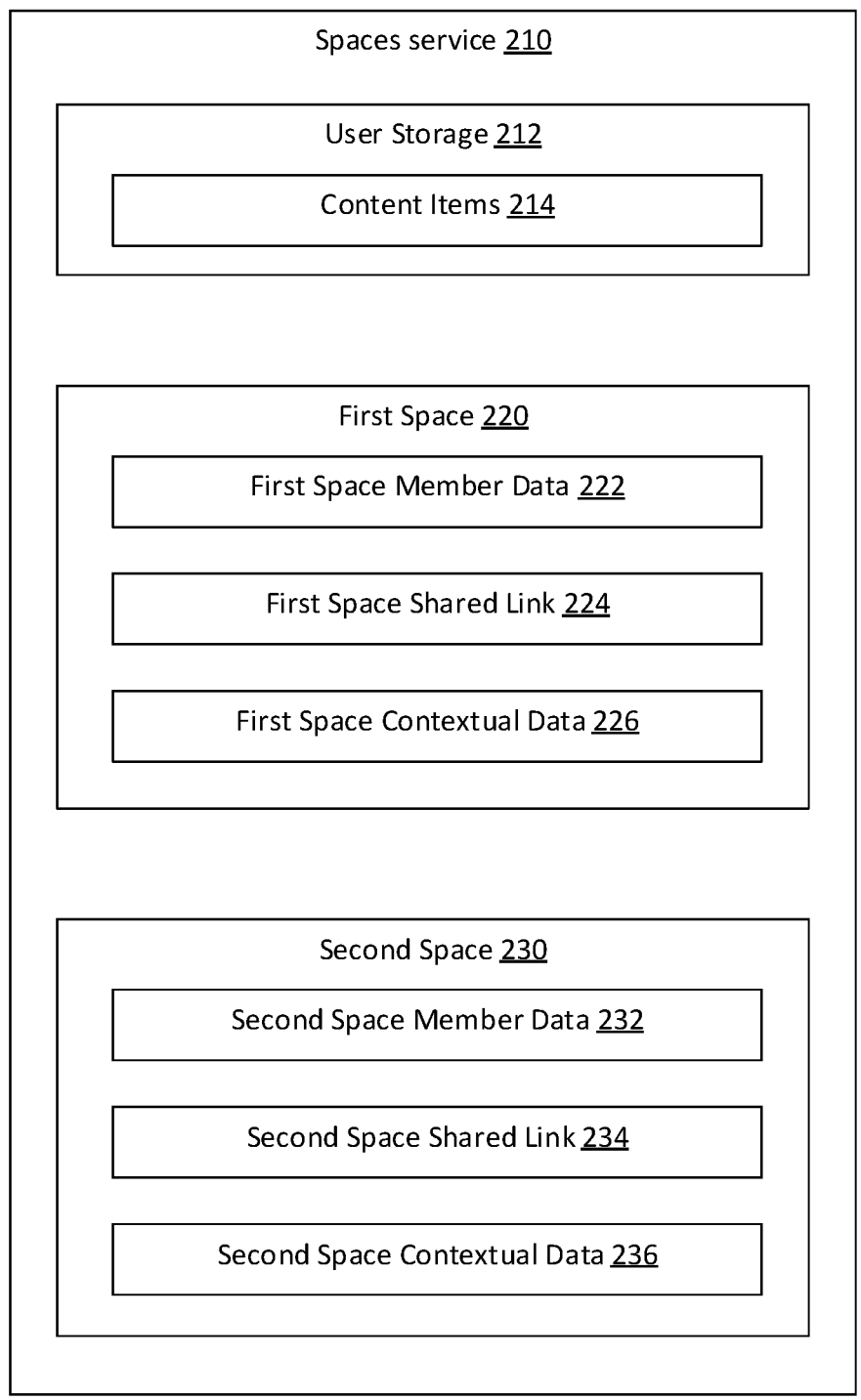
FIG. 2 shows an example of a spaces service of a content management system.

Referring now to FIG. 2, spaces service 210 is described. Spaces service 210 can be part of a content management system 110 as described in FIG. 1. In some embodiments, spaces service 210 can be a standalone service capable of communicating with or integrated with content management system 110 (e.g., via an API). Spaces service 210 has access to a user storage 212 (e.g., a user storage associated with a user account in content storage 142) and can host a first space 220 and a second space 230. Spaces service 210 can generate spaces 220, 230. Although FIG. 2 shows a single user storage 212 and two spaces 220, 230, it is to be understood that spaces service 210 can be configured to have more or less user storages and/or spaces.

User storage 212 can refer to a storage in a content storage (e.g., content storage 142 of content management system 110) associated with a user (e.g., an account holder). In some embodiments, spaces service 210 can have persistent access to any number of user storages 212 associated with respective users.

Additionally, user storage 212 can be configured to store one or more content items 214 (e.g., text file, document, video, photo, spreadsheet, presentation, etc.). In some embodiments, user storage 212 can store content items 214 in folders in user storage 212. Spaces service 210 can (e.g., via content storage service 116) determine a path to content item 214.

Spaces service 210 further has spaces 220, 230. Spaces 220, 230 are virtual workspaces that can be configured to allow collaboration among members of the space. Spaces 220, 230 can have member data 222, 232, shared links 224, 234 to content items, and contextual data 226, 236 for content items. As discussed further below, spaces 220, 230 can include a graphic user interface (GUI) that facilitates collaboration in the spaces 220, 230.

Spaces 220, 230 can have member data 222, 232 for each respective space. First space 220 has first space member data 222 and second space 230 has second space member data 232. Member data 222, 232 is any data that can identify each member of each space 220, 230. For example, member data 222, 232 can include a username, email address, phone number, unique ID, etc. Spaces service 210 can utilize the member data 222, 232 to determine and control permission settings for content within spaces 220, 230. Additionally, member data 222, 232 can be used to communicate invitations, notifications, or other information to members of spaces 220, 230.

Spaces 220, 230 can further have shared links 224, 234. Shared links 224, 234 can be symbolic links that point to a content item, such as content item 214 in user storage 212. When first space 220 has a shared link 224 to content item 214, members of first space 220 can access, view, and/or modify content item 214. Similarly, when second space 230 has a shared link 234 to content item 214, members of second space 230 can access, view and/or modify content item 214. When multiple spaces 220, 230 have shared links 224, 234 to content item 214, members of each space can access, view, and/or modify content item 214 (i.e. the same content item is accessible from both first space 220 and second space 230).

Shared links 224, 234 to content item 214 can be created by members of respective spaces 220, 230 that have access to content item 214. For example, spaces service 210 can receive a first input identifying content item 214 to add to first space 220 (e.g. dragging and dropping content item 214 to first space 220). Spaces service 210 can then create shared link 224 to content item 214. Additionally, spaces service 210 can add shared link 224 to first space 220. Similarly, spaces service 210 can receive a second input identifying content item 214 to add to second space 230. Spaces service 210 can then create shared link 234 to content item 214. Additionally, spaces service 210 can add second space shared link 234 to second space 230. Thus, spaces service 210 can create multiple shared links and add respective shared links to respective spaces. It is further contemplated that each space can have shared links to different locations. For example, first space 220 may have a shared link to a document in the Internet and another shared link to a document in a content management system.

Spaces 220, 230 can further have contextual data 226, 236 for content items. Contextual data 226, 236 is any data providing context to a space and can include messages, assigned tasks, changes, and other contextual information associated with content items. For example, first space 220 can have shared link 224 pointing to content item 214. Additionally, first space 220 can have members collaborating and assigning tasks and deadlines associated with content item 214. First space contextual data 226 for content item 214 can include the assigned tasks and deadlines associated with content item 214. At the same time, second space 230 can have a second space shared link 234 pointing to the same content item 214. Second space 230 can have members collaborating and assigning different tasks and deadlines associated with the same content item 214. Thus, second space contextual data 236 for the same content item 214 can include the different tasks and deadlines associated with the same content item 214. Each space 220, 230 can have contextual data 226, 236 for any content item and the contextual data 226, 236 for each space is unique to the respective space even when the contextual data pertains to the same content item. First space contextual data 226 can be displayed in first space 220, while withholding presentation of first space contextual data 226 in other spaces, such as second space 230.

Figure 3:
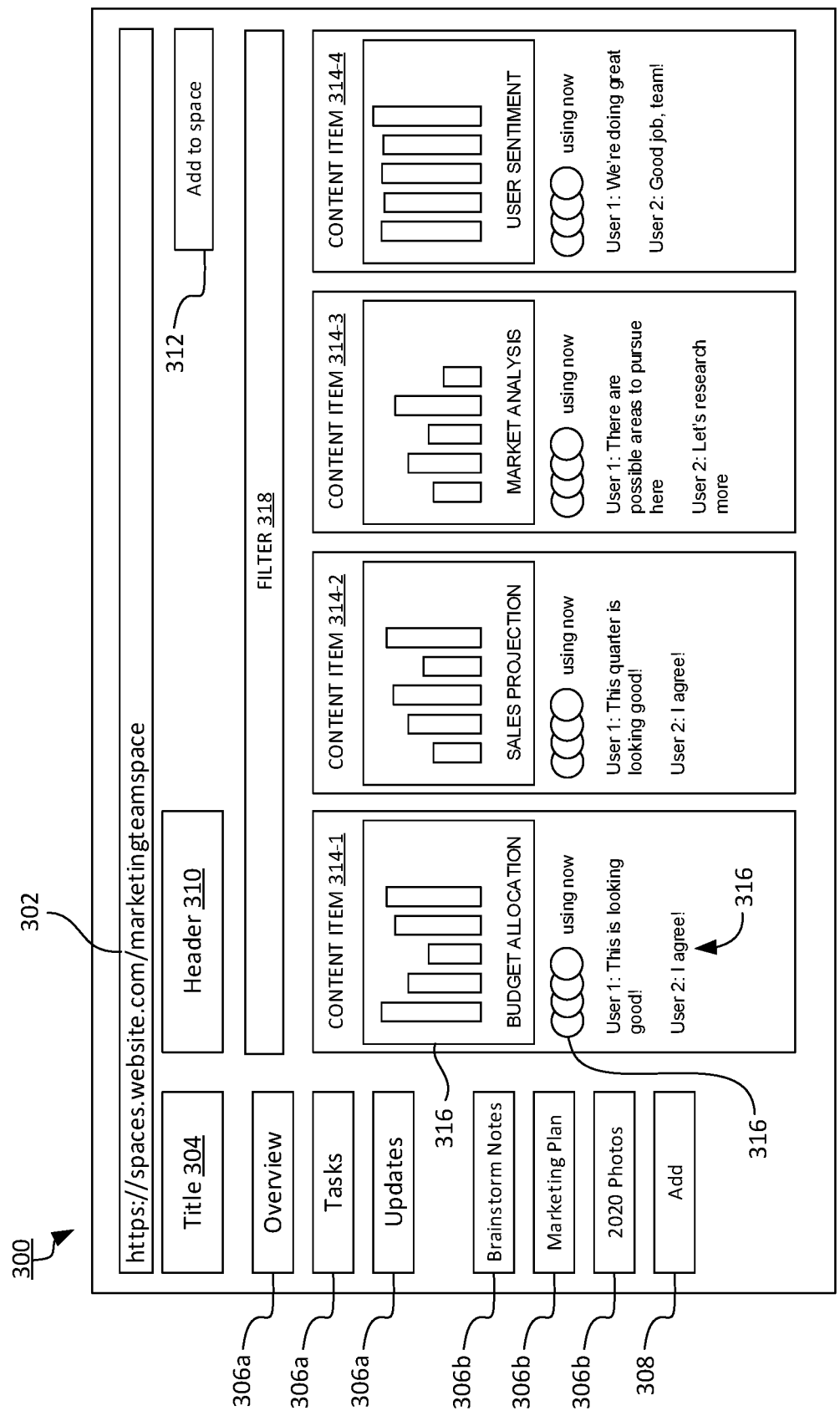
FIG. 3 shows an example graphical user interface for a space having multiple content items.

FIG. 3 shows an example GUI for a space 300 having multiple content items and hosted by a spaces service (e.g., spaces service 210).

Space 300 can be configured to have a universal resource locator (URL) 302. Additionally, the spaces GUI can include a title 304 that indicates and/or identifies space 300.

The spaces GUI can also include navigational links or buttons 306a, 306b (collectively navigational links 306). Navigational links 306 may be configured to navigate to and display specific contextual information relevant to space 300 (e.g., an overview of content items in space 300, tasks, updates or changes, etc.). Additionally, some navigational links 306b may be user identified links that navigate to and display specific content items. For example, a user may add a quick link 306b to brainstorm notes, a marketing plan, a photoset, etc.

Spaces GUI can also include one or more configuration buttons 308 that provide additional configuration and/or customization of space 300. For example, configuration button 308 can allow users to add navigational buttons 306a and/or quick links 306b to space 300.

Spaces GUI can also include one or more headers 310. Header 310 can identify which contextual information the spaces GUI is currently displaying. For example, when a user is on an overview page that shows an overview of content items in space 300, header 310 can be configured to identify the current page as the overview page.

Spaces GUI can also include one or more functional buttons 312 that allow users to modify content items in space 300. For example, functional button 312 can allow and/or facilitate addition of a content item (e.g. content item 314-1) to space 300.

Spaces GUI can also include one or more content items 314-1, 314-2, 314-3, 314-4 (collectively content items 314).

As discussed above, content items can be files, documents, spreadsheets, presentations, slideshows, etc.

Additionally, spaces GUI can also be configured to display contextual information 316. For example, FIG. 3 shows spaces GUI displaying contextual information 316 for content items 314, such as previews, active users or members, and comments from users. The previews for content items 314 can be displayed, for example, by communicating with and utilizing (e.g., via an API) collaborative document service 134. Active users or members can be identified, for example, based on member data (e.g., member data 222, 232) and detected communication with server synchronization service 112, web interface service 124, collaborative document service 134, etc.

A filter 318 may also be included in spaces GUI. Filter 318 can be configured to filter content items 314 based on tags, keywords, objects, file types, etc.

Figure 4B:
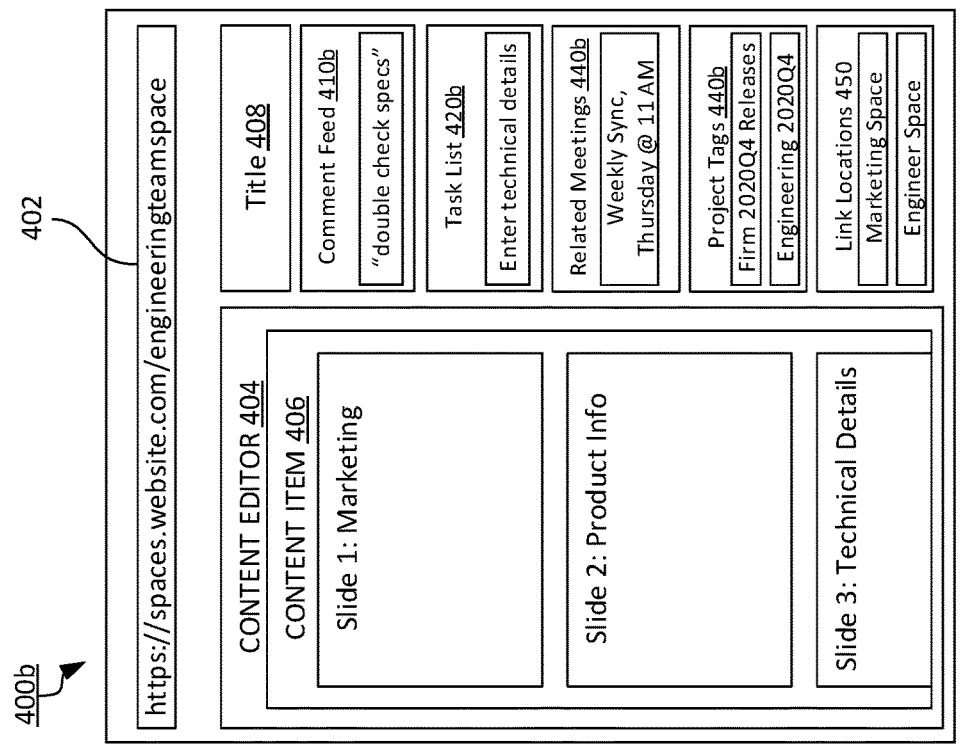
FIGS. 4A-4B show example graphical user interfaces for spaces hosted by a spaces service.
Figure 4A:
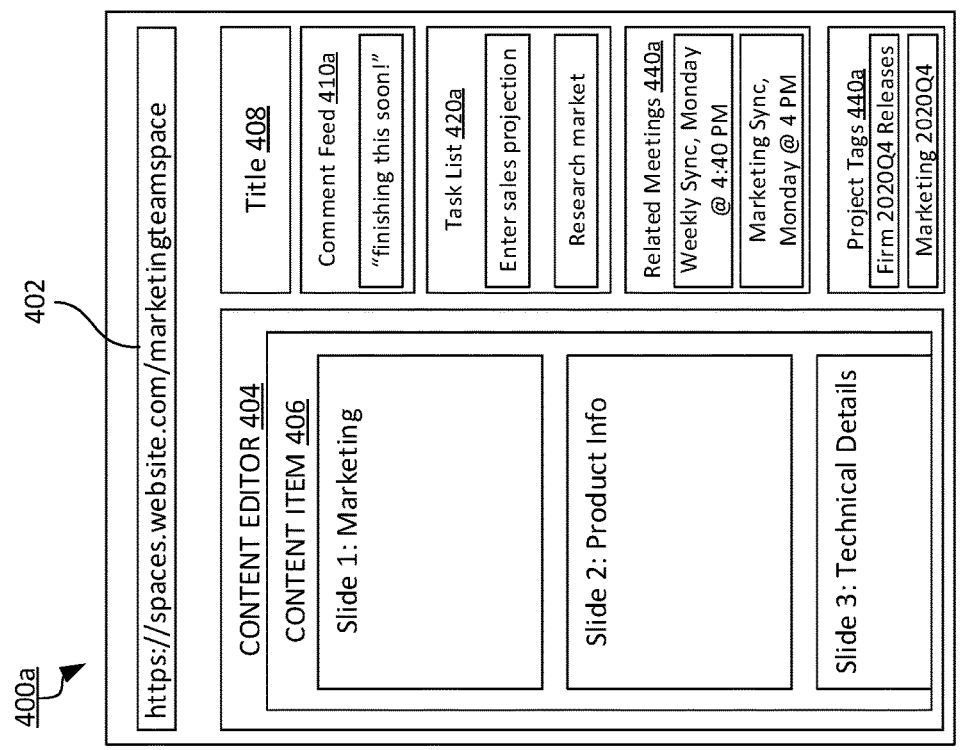

FIGS. 4A-4B show example spaces GUIs for a first space 400a and a second space 400b. Spaces 400a, 400b can be configured to have a URL 402 for each space. Additionally, the spaces GUI can include (e.g., through an API) a collaborative content item editor 404 (e.g., the collaborative content item editor described in collaborative document service 134) in each space. Members of each space 400a, 400b can utilize collaborative content item editor 304 to preview, view, and/or edit content item 214. Additionally, edits and modifications made using collaborative content item editor 404 can be logged as contextual data based on the space from which a user is accessing content item 214. Content item 406 can be a content item as discussed above regarding content item 214 in FIG. 2. For example, content item 406 may be a presentation or slideshow compiled by various departments or teams in an organization. Content item 406 may relate to multiple departments or teams. Accordingly, content item 406 may be linked to multiple spaces for collaborative work by each department or team.

Additionally, each space 400a, 400b can provide additional contextual information or data associated with content item 406. For example, in FIG. 4A, title 408, comment feed 410a, task list 420a, related meetings 430a, and project tags 440a are stored and presented in space 400a. Some contextual information can be shared across spaces 400a, 400b, such as title 408. For example, title 408 can be the name of the file, which may stay consistent across spaces 400a, 400b. Additionally, some contextual information can be unique to each space 400a, 400b. For example, space 400a may be a space dedicated to a marketing team of a business, while space 400b is a space dedicated to an engineering team. Interactions and collaboration among members of space 400a may be suited specifically towards marketing team goals and tasks. Some contextual information in space 400a, such as comment feed 410a, task list 420a, related meetings 430a, and project tags 440a can be unique to the marketing team and unique to space 400a. Some contextual information, such as project tags 440a can be partially shared among spaces 400a, 400b. For example, project tags 440a can include tags that are organization-wide and tags that are only team-wide.

As shown in FIG. 4B, space 400b may have access to content item 406. However, contextual information in space 400b, such as comment feed 410b, task list 420b, related meetings 430b, and project tags 440b, can differ from the contextual information presented in space 400a.

Additionally, FIG. 4B shows that spaces, such as space 400b, may provide a link location view 450 to all spaces that have content item 406 linked. In some embodiments, a spaces service (e.g., spaces service 210) can be configured to identify each space that has a link to content item 406. For example, the spaces service can log and/or store each link or record thereof and identify, based on the links and/or records thereof, which spaces have a link to the content item 406. Link location view 450 can then display the locations and/or spaces that are linked to content item 406.

Additionally, FIG. 4B also demonstrates that spaces can be configured to have different layouts to show different contextual information (e.g., comment feeds, task lists, related meetings, project tags, spaces linked to content items, etc.).

Figure 5:
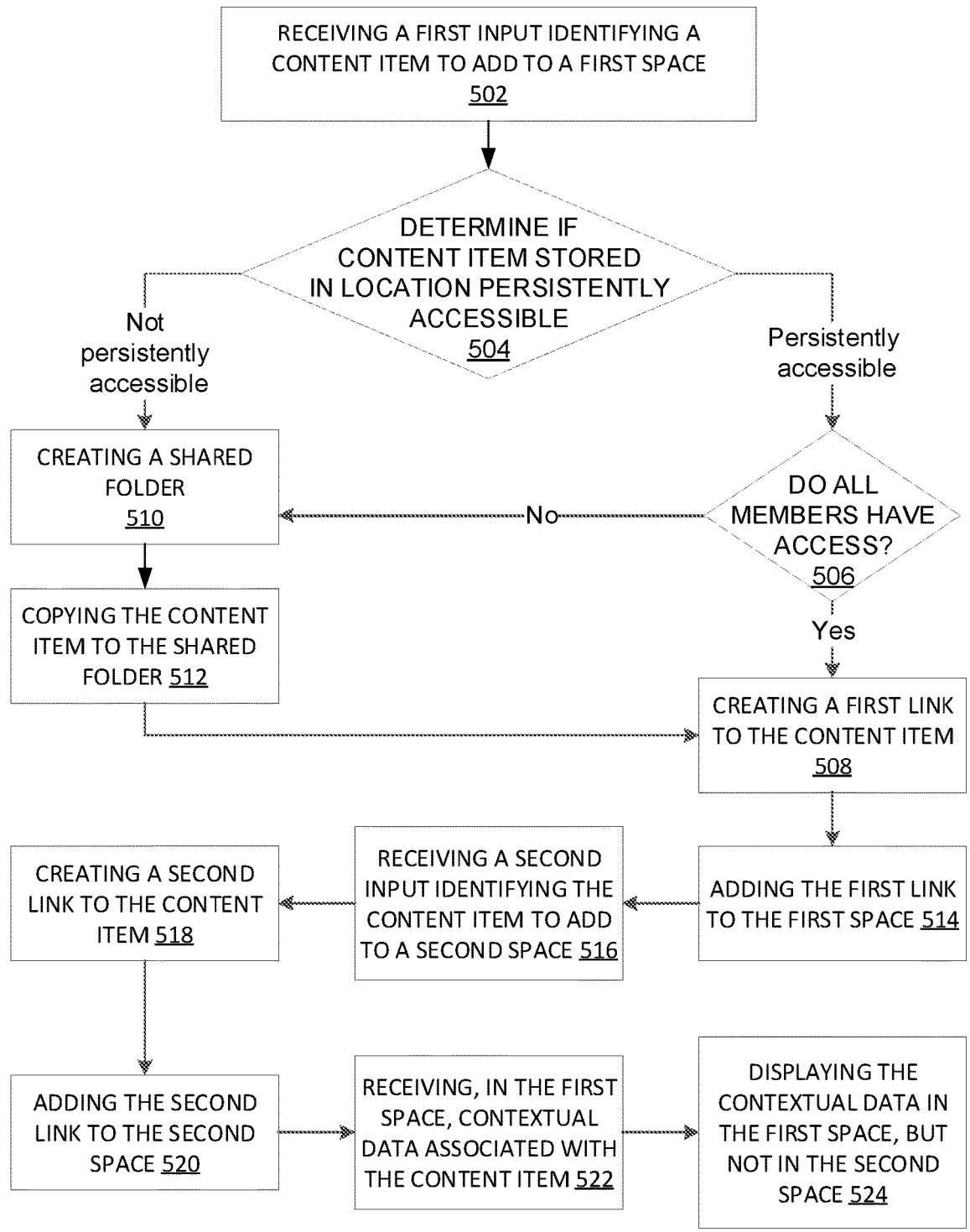
FIG. 5 shows an example flowchart of a method for content management in virtual spaces across multiple virtual spaces.

FIG. 5 shows an example flowchart of a method for content management in virtual spaces across multiple virtual spaces. FIG. 5 is discussed in the context of spaces service 210 carrying out the method. Spaces service 210 can be a service of content management system 110 or independent from content management system 110. In some embodiments, the method illustrated in FIG. 5 can also be carried out by one or more other services. The process can begin with a spaces service 210, receiving 502 a first input identifying a content item to add to a first space. For example, spaces service 210 can receive and detect a file dragged and dropped into the first space (e.g. space 300a).

Next, spaces service 210 determines 504 if the content item was stored in a location persistently accessible by the first space and/or members or users of the first space. For example, a content item stored in a public folder in user storage 212 in spaces service 210 is persistently accessible by members of the first space. A content item that is accessible over the Internet and for which members of the first space have credentials (if required) to access the content item can be considered persistently accessible. However, a content item that is not stored on a server that is persistently available, or that requires credentials not held by members of the space is not persistently accessible by the first space. For example, a content item stored on a user's laptop only would not be persistently available because the laptop is prone to be shut off or suspended.

If spaces service 210 determines 504 that the content item is stored in a location that is persistently accessible by the first space, spaces service 210 determines 506 whether all members of the first space are authorized to access the content item and/or the location of the content item. For example, the content item can be stored in a private folder or directory in user storage 212 that not all members of the first space are authorized to access.

If spaces service 210 determines 506 that all members of the first space have access to the content item and/or the location of the content item, spaces service 210 creates 508 a first link to the content item. In some embodiments, spaces service 210 can, after determining that the location is a directory to which all user accounts of the first space are authorized to access, provide an option to at least one user account with access to the first space to select the location as the directory to be associated with the first space. In embodiments wherein spaces service 210 is not part of content management system 110, spaces service 210 may need to request the first link from content management system 110.

If spaces service 210 determines 504 that the content item is stored in a location that is not persistently accessible and/or determines 506 that not all members have access to the content item and/or the location of the content item, then spaces service 210 creates 510 a shared folder that is persistently accessible by the first space. In some embodiments, the shared folder can be located in content management system 110. The shared folder can be configured to provide access to the shared folder to user accounts with access to the first space. For example, based on first space member data 222, spaces service 210 can identify user accounts with access to the first space 220 and authorize access to the newly created shared folder to the identified user accounts. In some embodiments, spaces service 210 can also, after determining 504 that not all members have access to the location or folder, provide an option to at least one user account with access to the first space to select the location as the directory to be associated with the first space. In other words, spaces service 210 can provide an option to automatically share the folder with (e.g., provide access permissions to) members of the first space. In embodiments wherein spaces service 210 is not part of content management system 110, spaces service 210 may need to interact with content management system 110 through an API to perform these steps.

Next, spaces service 210 copies 512 the content item to the shared folder. In some embodiments, spaces service 210 can instead create a permissive link in the shared folder that gives access to the content item in the original location. The permissive link can be configured to provide access only to the specific content item. This results in the permissive link providing access to a content item that at least one user could not previously access by navigating to the directory.

Spaces service 210 can then create 508 the first link to the copy of the content item in the shared folder, so future interactions with the linked content item occur with the content item in the shared folder. In some embodiments, the first link can be configured to provide access to the specific content item only, so the first link can give access to a file that at least one user couldn't access by manually navigated to the directory.

After spaces service 210 creates 508 the first link, spaces service 210 can add 414 the first link to the first space, so members of the first space can access the content item by using the first link. For example, members of the first space can request to view the content item using the first link. In some embodiments, spaces service 210 can render a first preview of the content item in a user interface associated with the first space. Additionally, the spaces service 210 can receive a selection of the first preview of the content item and, in response to the selection, open the content item in a content item editor.

Next, spaces service 210 may receive 516 a second input identifying the content item (or the copy of the content item) to add to a second space. For example, a user having access to the content item may provide an input to add the content item to another space for another department to collaborate with.

Spaces service 210 may then create 518 a second link to the content item and/or the copy of the content item. The first link to the content item and the second link to the content item point to the content item stored in the same location. Accordingly, in some scenarios (e.g. when the content item was stored in the content management system in a shared folder), the first link to the content item and the second link to the content item point to the content item stored in the same location as it was stored prior to receiving the first input. In some embodiments, the content item may be stored in a location that is not persistently accessible by members of the second space. Accordingly, the spaces service 210 can automatically authorize access to the content item and/or the location of the content item to members of the second space.

Spaces service 210 can then add 520 the second link to the second space.

In some embodiments, spaces service 210 can receive 522, in the first space, contextual data associated with the content item. For example, users may add tasks, meeting dates, comments, tags, activities, timelines, deadlines, updates, notes, assets, related files, etc. to the first space.

Spaces service 210 can then display 524 the contextual data in the first space, while withholding presentation of the contextual data in the second space. For example, meetings for members of the first space may be shown in the first space, but not the second space.

Figure 6:
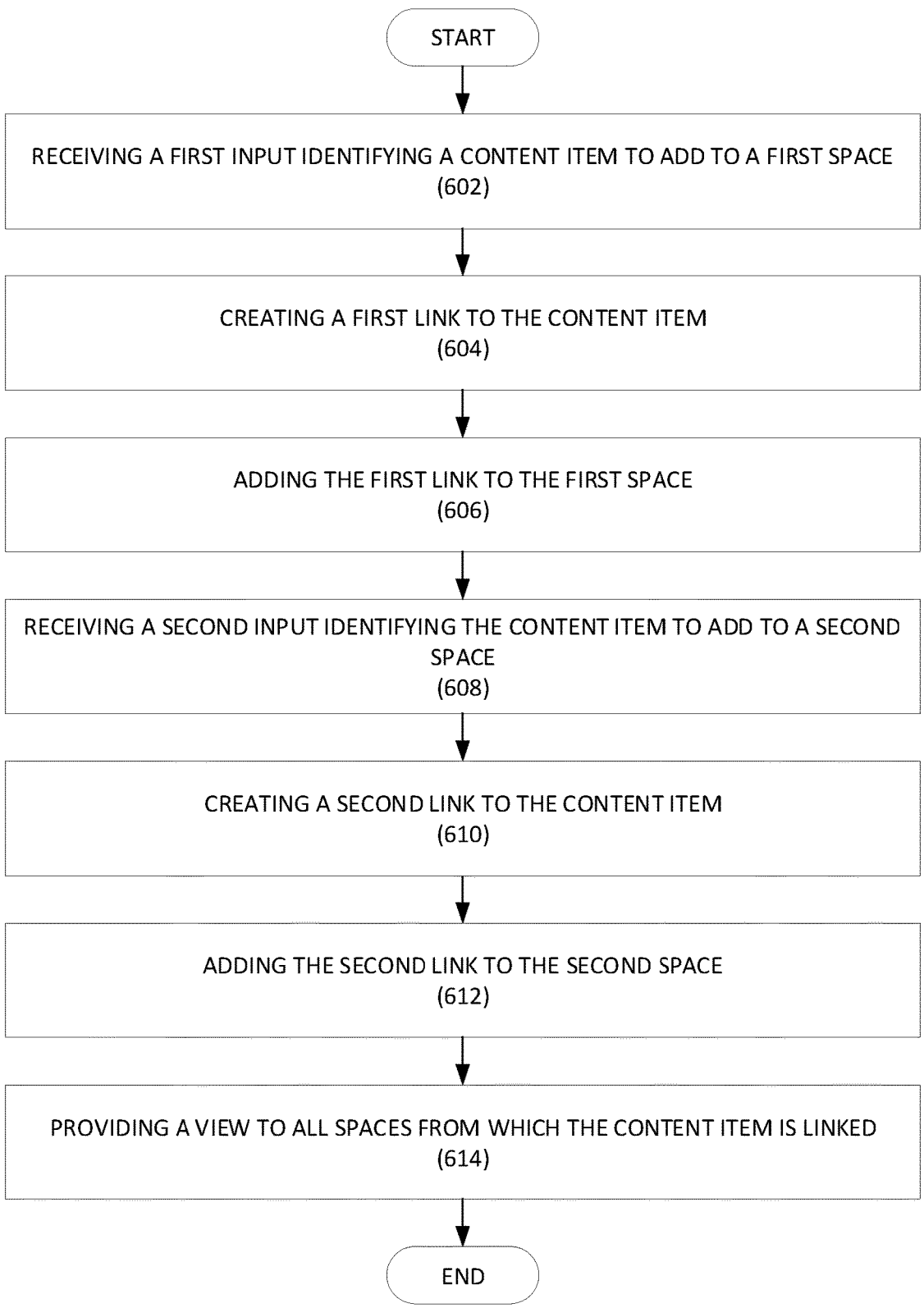
FIG. 6 shows an example flowchart of a method for content management in virtual spaces across multiple virtual spaces.

FIG. 6 shows an example flowchart of a method for managing content in virtual spaces across multiple virtual spaces. The example method can begin with a content management system receiving 602 a first input identifying a content item to add to a first space.

The content management system can then create 604 a first link to the content item. As discussed above, the content management system can create 604 the first link to the content item, such that the first link directs to a current location of the content item. In some embodiments, the first link can be a permissive link in a new or shared folder. The permissive link can be configured to provide access permissions to the content item in the current location. In some embodiments, the first link directs to a new or shared folder having a copy of the content item. Additionally, in some embodiments, the first link can be configured to direct and provide access to the content item only when a user uses the first link through the content management system.

Next, the content management system can add 606 the link to the first space.

The content management system can then receive 608 a second input identifying the content item to add to a second space.

The content management system can then create 610 a second link to the content item.

Next, the content management system can add 612 the second link to the second space.

Additionally, the content management system can provide 614 a view to all spaces from which the content item is linked. For example, the content management system can log and/or store links between the spaces and the content item and provide a view (e.g., link locations 450 as discussed with respect to FIG. 4B) of the spaces that have a link to the content item.

Figure 7:
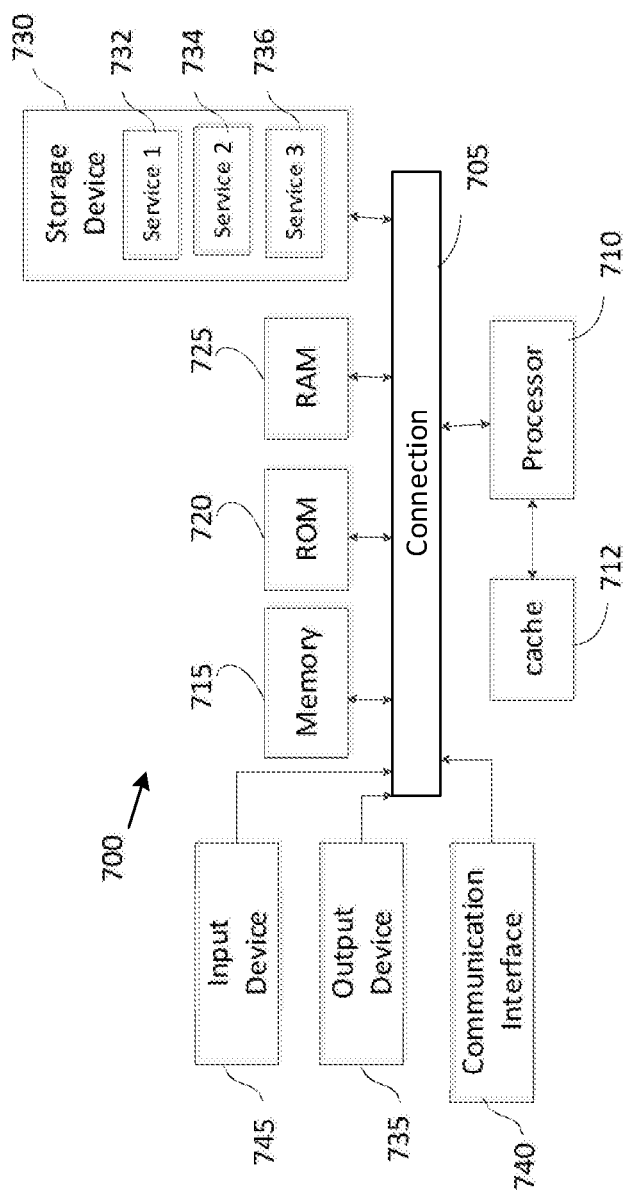
FIG. 7 shows an example of a system for implementing certain aspects of the present technology.

FIG. 7 shows an example of computing system 700, which can be for example any computing device making up client device 150, content management system 110, spaces service 210, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving a first input identifying a content item that is stored at a first location;
  creating a first link to the content item stored at the first location;
  adding the first link to a first space, wherein interaction with the first link in the first space initiates access to the content item stored at the first location;
  after receiving the first input, determining that the content item stored at the first location is not persistently accessible by the first space;
  copying the content item to a second location in a content management system that is persistently accessible by the first link in the first space;
  receiving a second input identifying the content item to add to a second space;
  creating a second link to the content item at the second location; and
  adding the second link to the content item at the second location to the second space.

2. The method of claim 1, wherein adding the first link further comprising:
  rendering a first preview of the content item in a user interface associated with the first space;
  receiving a selection of the first preview of the content item; and
  opening the content item in a content item editor.

3. The method of claim 1, further comprising:
  receiving contextual data associated with the content item in the first space; and
  displaying the contextual data associated with the content item in the first space, but not displaying the contextual data in the second space.

4. The method of claim 1, wherein the first link to the content item and the second link to the content item point to the content item stored at the second location in the content management system that is persistently accessible by the second space.

5. The method of claim 1, further comprising:
  creating a shared folder in the content management system, wherein user accounts having access to the first space also have access to the shared folder, wherein the second location is in the shared folder.

6. The method of claim 1, further comprising:
  after copying the content item to the second location, determining that the second location is a directory to which not all user accounts that have access to the first space are authorized to access;
  creating a shared folder in the second location in the content management system, wherein user accounts having access to the first space also have access to the shared folder;
  providing a second copy of the content item to the shared folder; and
  updating the first link in the first space to point to the second copy of the content item.

7. The method of claim 1, further comprising:
  after copying the content item to the second location, determining that the second location is a directory to which all user accounts that have access to the first space are authorized to access;
  and providing an option to at least one user account that has access to the first space to select the second location as the directory to be associated with the first space.

8. The method of claim 1, further comprising:
  providing a view to all spaces from which the content item is linked.

9. A non-transitory computer readable medium comprising instructions stored thereon, the instructions, when executed by a computing system, cause the computing system to:
  receive a first input identifying a content item that is stored at a first location;
  create a first link to the content item stored at the first location;
  add the first link to a first space, wherein interaction with the first link in the first space initiates access to the content item stored at the first location;
  after receiving the first input, determine that the content item is stored at the first location is not persistently accessible by the first space;

copying the content item to a second location in a content management system that is persistently accessible by the first link in the first space;

receive a second input identifying the content item to add to a second space;

create a second link to the content item in the second location; and add the second link to the content item at the second location to the second space.

10. The non-transitory computer readable medium of claim 9, further comprises instructions that, when executed by the computing system, cause the computing system to:

receive contextual data associated with the content item in the first space; and display the contextual data associated with the content item in the first space, but not display the contextual data in the second space.

11. The non-transitory computer readable medium of claim 9, wherein the first link to the content item and the second link to the content item point to the content item stored at the second location in the content management system that is persistently accessible by the second space.

12. The non-transitory computer readable medium of claim 9, further comprising instructions that, when executed by the computing system, cause the computing system to:

create a shared folder in the content management system, wherein user accounts having access to the first space also have access to the shared folder, wherein the second location is in the shared folder.

13. The non-transitory computer readable medium of claim 9, further comprising instructions that, when executed by the computing system, cause the computing system to:

after copying the content item to the second location, determine that the second location is a directory to which not all user accounts that have access to the first space are authorized to access;

create a shared folder in the second location in the content management system, wherein user accounts having access to the first space also have access to the shared folder;

provide a second copy of the content item to the shared folder; and updating the first link in the first space to point to the second copy of the content item.

14. The non-transitory computer readable medium of claim 9, further comprising instructions that, when executed by the computing system, cause the computing system to:

after copying the content item to the second location, determine that the second location is a directory to which all user accounts that have access to the first space are authorized to access;

and provide an option to at least one user account that has access to the first space to select the second location as the directory to be associated with the first space.

15. A system comprising:

one or more processors; and at least one computer-readable storage medium having stored therein instructions which, when executed by the one or more processors, cause the system to:

host a first space, at a spaces service, that collects first data pertaining to a first topic, wherein the first data includes a first link to a content item in a first location, wherein interaction with the first link in the first space initiates access to the content item stored at the first location, and the spaces service is further configured to host a second space, at the spaces service, that collects second data pertaining to a second topic, wherein the second data includes a second link to the content item in the first location;

determine that the content item is not stored at a location that is persistently accessible by the first space; and copy the content item to a second location that is persistently accessible by the first link in the first space and the second link in the second space.

16. The system of claim 15, wherein the instructions which, when executed by the one or more processors, further cause the system to:

store the content item in a content management system, wherein the content management system is further configured to regulate access to the content item.

17. The system of claim 15, wherein the spaces service is configured to render a first preview of the content item in a user interface associated with the first space, and to receive a selection the first preview of the content item, and wherein the spaces service is configured to communicate with a content management system to open the content item in a content item editor.

18. The system of claim 15, wherein the spaces service is configured to receive contextual data associated with the content item in the first space, and to display the contextual data associated with the content item in the first space, but not in the second space.

* * * * *